Patented Sept. 10, 1940

2,214,104

UNITED STATES PATENT OFFICE 2,214,104

POROUS METAL ARTICLE

John M. Hildabolt and Arthur R. Shaw, Dayton, Ohio, assignors to General Motors Corporation, Detroit, Mich., a corporation of Delaware No Drawing. Application May 20, 1938, Serial No. 209,067

8 Claims. (Cl. 75—22)

The present invention relates to porous metal articles and more particularly to porous iron articles which include a soft metal in the elemental state.

It is an object of this invention to provide a porous metal article for use in bearings and the like, which includes a matrix of iron coated with a soft metal which is substantially insoluble in iron.

A further object of the invention is to provide a porous metal bearing comprising iron and lead in which the proportions of iron and lead are in the ratio of at least 3 to 1.

A still further object of the invention is to provide a porous metal bearing comprising at least 70 parts iron, 20 parts lead and 2 parts graphite.

A still further object of the invention is to provide a porous metal bearing which may subsequently be impregnated with oil, or other lubricant comprising, 78 parts of iron, 20 parts of lead, and 2 parts of graphite.

Another object of the invention is to provide a method for making such a bearing comprising the steps of intimately mixing iron and lead powders, briquetting the mixture into the form desired, and then sintering the briquette at such a temperature and for such a time as will cause the iron to sinter together and form a porous matrix which is substantially coated with the lead.

Further objects and advantages of the present invention will be apparent from the following description.

In certain applications of bearings, the use of a porous iron bearing having a lubricating or flowing metal therein such as lead, bismuth or cadmium etc., is highly desirable. Such bearings, due to their iron matrix have high strength, and therefore stand up well under heavy load conditions. The use of lead, bismuth or cadmium, or other soft metal in such bearings is particularly desirable since the soft metals mentioned are substantially insoluble in the iron, and therefore remain in their elemental state as a coating over the iron network, or matrix, to provide a soft metal bearing surface which tends to flow or wipe during rotation of the shaft which is journaled in the bearing, thereby reducing the friction at the bearing surface, and providing a bearing surface having properties similar to the soft metal. The iron matrix of the bearing is of high strength and good ductility and therefore provides an ideal supporting matrix having sufficient porosity to absorb a quantity of oil, which exudes from the bearing surface during use of the bearing and functions as a fluid lubricant. Furthermore, the lead or other soft metal is beneficial in the briquetting die as a die lubricant. In order to provide additional lubrication it has been found that small quantities of graphite, added to the initial metal powder mixture, will remain dispersed in the porous metal bearing after sintering and thus yield an additional lubrication at the bearing surface.

In carrying out the present invention we have found that powdered metal mixtures in which iron is used in quantities of at least 3 parts iron to 1 part of lead, or other soft metal, gives the best results. One of such mixtures which has been found to yield very successful results comprises at least 70 parts iron, 20 parts lead and at least 2 parts graphite. A preferred formula comprehends 78 parts iron, 20 parts lead and 2 parts graphite. In any of the above formulas small additions of stearic acid, zinc stearate or some other fatty acid or metallic salt thereof is preferably used as a die lubricant, such lubricant preferably being added in proportions of 1 part of the mixture.

Lead has been found to be a particularly desirable lubricating metal since lead is not soluble in iron, and therefore remains as a coating on the iron matrix. It is apparent that any other soft metal which is insoluble or substantially insoluble in iron would yield analogous results such as bismuth or cadmium etc.

In the preferred method of making the improved iron-lead bearing, the mixture of iron and lead powders, graphite and die lubricant is briquetted under pressures ranging from 20,000 to 60,000 lbs. per sq. inch into the form desired. The briquette so formed is then sintered under non-oxidizing conditions, preferably at a temperature approximating 2000° F., which temperature is substantially above the melting point of the soft insoluble metal and below the melting point of iron. When sintering at this temperature the lead has no tendency to sweat out of the briquette, but flows throughout the briquette and wets or coats the surface of the iron matrix. When sintering at 2000° F. it has been found that a heating period of 40 minutes yields a finished article of good strength and ductility. Sintering temperatures of from 1700° F. to 2300° F. can also be utilized with good results. Iron bearings using any other of the soft insoluble metals can be fabricated by a similar procedure by utilizing a sintering temperature below the boiling point of the soft metal.

The porous metal articles formed in carrying out the steps, hereinbefore referred to have a porosity approximating of from 1% to 4½% by weight, according to the briquetting pressure utilized, such porosity being inversely proportional to the briquetting pressure.

Although it is preferable to use sponge iron powder as the basic ingredient in the manufacture of our improved bearings, other iron powders may be used successfully such as, comminuted iron, electrolytic iron, iron from reduced iron oxide, etc., either pure or with a suitable alloying metal such as copper, nickel, tin, etc., which is soluble in the iron at the sintering temperature.

It has been found that leaded porous iron bearings as fabricated by the method disclosed herein will operate successfully through long periods of service without bearing failure. It has further been found that such bearings, due to the porosity thereof and the capability to absorb a fluid lubricant, are particularly well suited for many bearing installations wherein bronze bearings have heretofore been utilized.

The soft bearing metal at the bearing surface provides a bearing surface that has all the advantages of a leaded bronze bearing, as is commonly used, without the attendant higher cost of manufacture. Furthermore, as previously set forth, the iron bearing having a leaded or otherwise coated bearing surface is superior in strength to a bronze bearing, and therefore more desirable in installations wherein heavy shaft loading, etc., is experienced.

It is apparent that the formulas disclosed herein could also be used in the fabrication of articles other than bearings, such as clutch facings, etc., or in fact any article that is used in rubbing contact, whether for frictional or anti-frictional purposes. In the case of clutches it may be desirable to add some refractory abrasive, such as asbestos, silica, alumina, etc., to raise the coefficient of friction of the article. The leaded surface in this case provides smooth operation without grabbing or galling. In all cases the final porosity of the article may be controlled by hot or cold pressing, subsequent to the sintering step, to bring the article to size.

While the embodiments of the present invention as herein disclosed, constitute preferred forms, it is to be understood that other forms might be adopted, all coming within the scope of the claims which follow.

What is claimed is as follows:

1. A porous metal article for use in bearings and the like consisting of a porous matrix of sintered iron powder substantially coated with a soft metal which is substantially insoluble in iron said matrix containing up to 2% of graphite.

2. A porous metal article made from sintered metal powders for use in bearings and the like comprising, at least 70% iron, at least 20% lead and about 2% graphite, said article being porous and capable of subsequent impregnation with a lubricating compound.

3. A porous metal bearing made from sintered metal powders capable of subsequently being impregnated with lubricant compound comprising, at least 70 parts iron, 20 parts lead and 2 parts graphite.

4. A porous metal bearing capable of subsequently being impregnated with a lubricant compound comprising, 78 parts of iron, 20 parts of lead and 2 parts of graphite.

5. A porous metal bearing capable of subsequently being impregnated with a lubricant compound comprising, 78 parts of iron, 20 parts of lead and 2 parts of graphite, said bearing having a final porosity of at least 1% by weight.

6. A porous ferrous bearing made from sintered metal powders and capable of subsequently being impregnated with a lubricant comprising, at least 3 parts of iron to one part of a metal of the group including lead, cadmium or bismuth and varying small amounts of graphite.

7. A porous metal article made from sintered metal powders for use in rubbing contact with another surface for friction or anti-friction purposes consisting of a porous sintered ferrous matrix substantially coated over the entire porous surface thereof with a metal which is substantially insoluble in the matrix metal, said matrix containing about 2% of graphite.

8. A porous sintered iron article adapted for use in rubbing contact with another surface for frictional or anti-frictional purposes, consisting of a matrix of sintered iron powder including graphite up to 2% of the weight of iron and having a coating covering substantially the entire porous surface thereof consisting of a soft insoluble metal, the rubbing surface of the article having characteristics of the soft metal, the ratio of iron to the soft metal being in the order of 3 to 1.

JOHN M. HILDABOLT.
ARTHUR R. SHAW.